US008816641B2

(12) United States Patent
Andrea et al.

(10) Patent No.: US 8,816,641 B2
(45) Date of Patent: *Aug. 26, 2014

(54) BI-DIRECTIONAL INVERTER-CHARGER

(76) Inventors: Davide Andrea, Boulder, CO (US);
Robert D. Emmerich, Loveland, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 13/428,252

(22) Filed: Mar. 23, 2012
(Under 37 CFR 1.47)

(65) Prior Publication Data

US 2012/0176090 A1    Jul. 12, 2012

Related U.S. Application Data

(63) Continuation of application No. 12/558,458, filed on Sep. 11, 2009, now Pat. No. 8,143,856.

(60) Provisional application No. 61/096,311, filed on Sep. 11, 2009.

(51) Int. Cl.
*H02J 7/00* (2006.01)

(52) U.S. Cl.
USPC .......................................... 320/128; 320/111

(58) Field of Classification Search
USPC .......................................................... 320/128
See application file for complete search history.

(56) References Cited

U.S. PATENT DOCUMENTS

| 6,894,471 B2* | 5/2005 | Corva et al. ............... 323/282 |
| 2004/0062059 A1* | 4/2004 | Cheng et al. ............... 363/17 |
| 2006/0103341 A1* | 5/2006 | Steigerwald et al. ....... 318/712 |
| 2007/0068714 A1* | 3/2007 | Bender .................... 180/65.4 |
| 2009/0237042 A1* | 9/2009 | Glovinski ................. 323/235 |

* cited by examiner

*Primary Examiner* — Drew A Dunn
*Assistant Examiner* — Robert Grant
(74) *Attorney, Agent, or Firm* — Polsinelli PC

(57) ABSTRACT

A bi-directional inverter-charger including a bridge rectifier and DC-to-DC conversion components. The inverter-charger may be connected between an alternating current source, e.g., an AC line, and a direct current source, e.g., a battery pack. The DC-to-DC conversion components may include boost and buck circuits that are switchably configured between a charge mode and an inverter mode such that common components are used in both charge and inverter configurations. In the charge configuration, a full wave rectified signal from the H-bridge is up converted by the boost circuit, and the buck circuit controls charge current to the direct current source. In the inverter configuration, the boost circuit up converts the direct current voltage source, and the buck circuit controls the current and its form to the bridge circuit so that the bridge circuit may be Connected directly with the AC source.

8 Claims, 11 Drawing Sheets

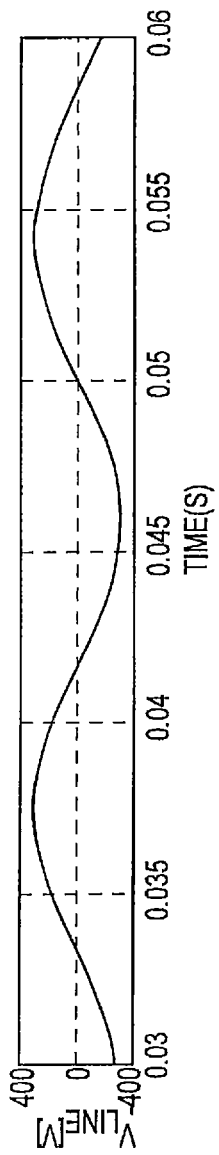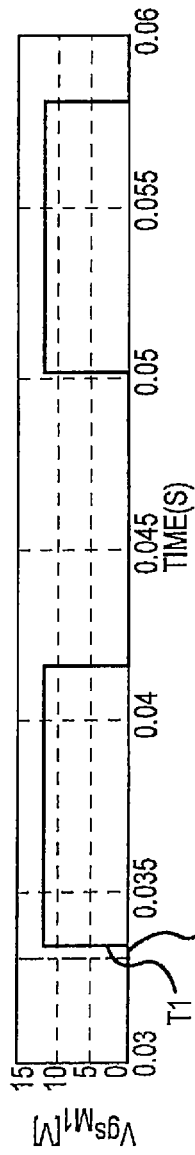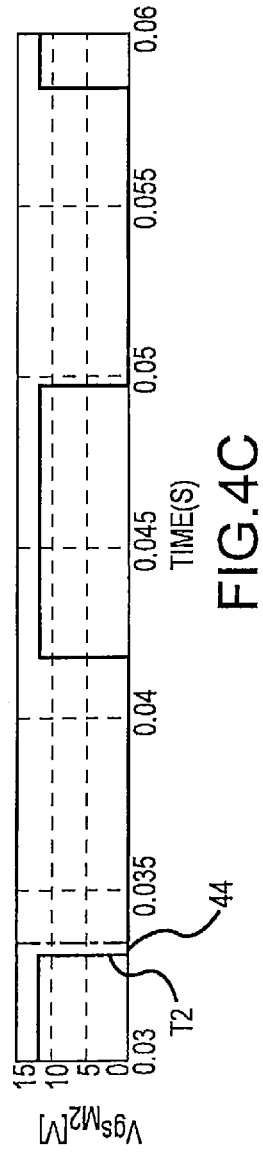

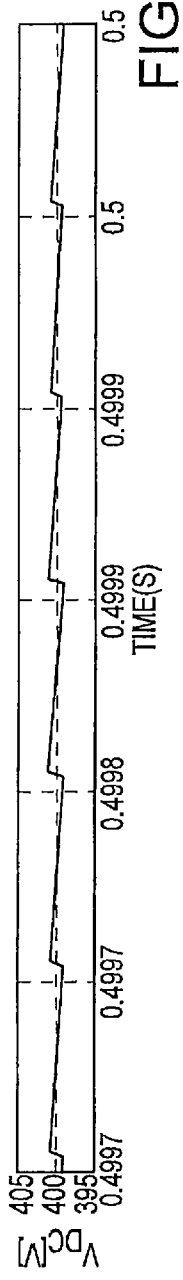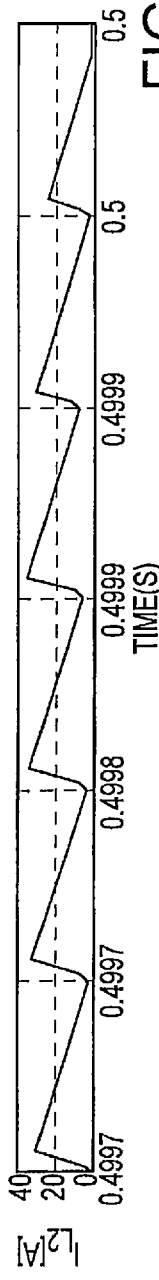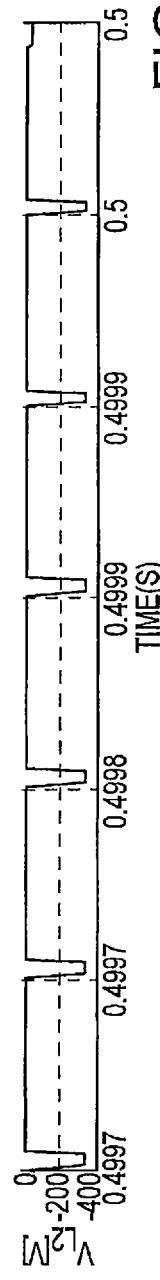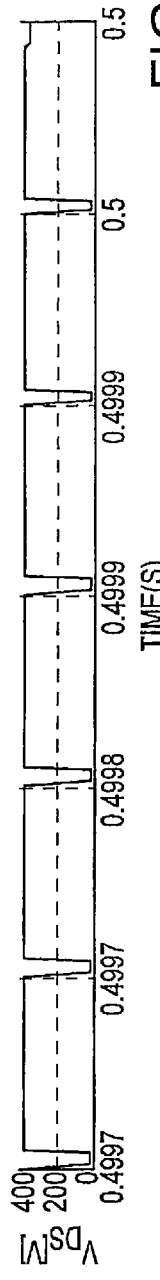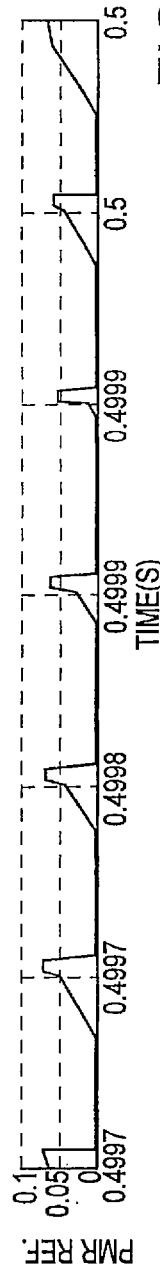

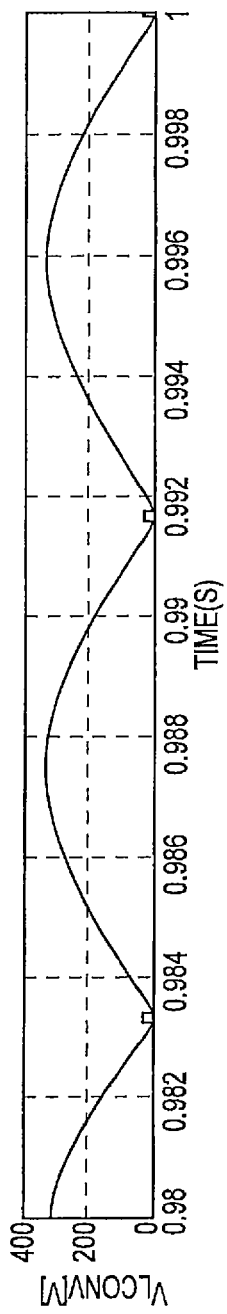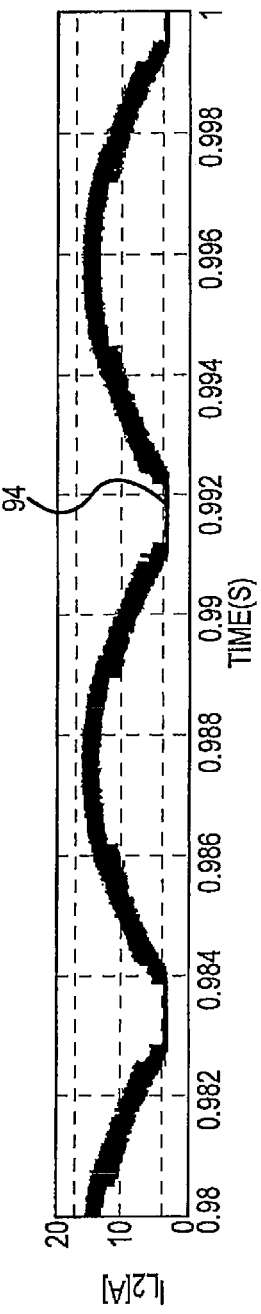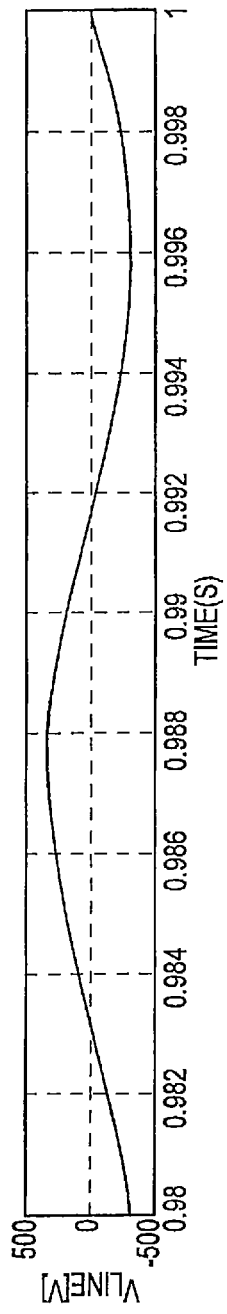

BI-DIRECTIONAL INVERTER-CHARGER

CROSS-REFERENCE TO RELATED APPLICATION

The present application is a continuation application claiming priority under 35 U.S.C. §120 to utility application Ser. No. 12/558,458 titled "Bi-Directional Inverter-Charger" filed on Sep. 11, 2009, which claims priority under 35 U.S.C. §119 (e) to provisional application No. 61/096,311 titled "Bi-directional Inverter-Charger System," filed on Sep. 11, 2008, which are hereby incorporated by reference herein.

FIELD OF THE INVENTION

Aspects of the present invention generally relate to a bi-directional inverter-charger system.

BACKGROUND

Products for converting alternating current (AC) to direct current (DC) are commonly found in the marketplace today. These products, when used to move electrical energy into a battery, are referred to as chargers. Products that convert DC into AC are referred to as inverters.

Hybrid-Electric Vehicles or "HEV"'s have both an electric drive train and a gasoline or other form of combustion engine. While various specific HEV configurations are possible, generally speaking, the electric motor may drive the vehicle, drawing energy from a battery pack alone or in combination with the combustion engine may also power a generator that charges the battery pack. One problem with many existing mass produced HEVs is that the full potential of the hybrid drive system is not realized due to the limited amount of on-board electrical energy storage. This problem is addressed by increasing the energy storage capacity of the vehicle to allow greater use of electricity in place of gasoline, which is being facilitated by technical advances in battery or other energy storage forms, among other things. Higher capacity energy storage systems facilitate charging from an external supply to offset and reduce petroleum fuel consumption that would otherwise be required by the petroleum fueled engine. Such a configuration is known as a Plug-in Hybrid Electric Vehicle or PHEV.

Now consider that PHEVs often now have a large capacity battery for electrical energy storage but that stored energy is used only when the vehicle is moving. When the vehicle is at rest the battery system is idle and underutilized. It has been recognized that the energy storage capacity of PHEVs could be utilized to store electrical energy when the power is available and it could be called upon to supply electrical energy when required during times of peak electric grid demand—a concept referred to as Vehicle-To-Grid or V2G.

SUMMARY

With a developing interest in V2G technologies, as well as V2H (vehicle-to-home), V2V (vehicle-to-vehicle) and other technologies where energy flows between differing sources, bidirectional inverter-charger systems are needed, among many other things. Aspects of the present invention involve a bi-directional topology using a single synchronous bridge rectifier or unfolder. The bi-directional inverter-charger provides both AC-to-DC conversion for charging a storage source, such as a battery pack, and DC-to-AC inversion for connecting the battery to the grid or other AC voltage source. This allows for the same power components to be used in both directions resulting in high energy transfer efficiency with fewer components.

Aspects of the present disclosure involve an inverter charger for providing a bidirectional energy flow between an alternating current source and a direct current chargeable voltage source. The inverter charger may include an H-bridge rectifier inverter circuit coupled with an alternating current voltage source. The inverter charger may further include a direct current voltage to direct current voltage converter (DC-to-DC converter) coupled between the H-bridge inverter circuit and a direct current chargeable voltage source having a direct current voltage, the DC-to-DC converter switchable between a charge configuration and an inverter configuration. The DC-to-DC converter, switched to charge configuration, includes a boost circuit operably coupled with the H-bridge. The H-bridge rectifier provides a full wave rectified output signal to the boost circuit. The boost circuit is configured to up convert the full wave rectified output signal. In the charge configuration, the DC-to-DC converter further includes a buck circuit operably coupled with the boost circuit. The buck circuit is configured to provide a regulated charge current to the direct current chargeable voltage source. The inverter charger, in inverter configuration, includes the boost circuit operably coupled with the direct current chargeable voltage source. The boost circuit is configured to up convert the direct current voltage of the direct current chargeable voltage source, and the buck circuit is configured to provide a full wave rectified signal wave form to the H-bridge. The H-bridge is configured to tie an alternating current voltage waveform to the alternating current voltage source. While the application generally refers to an alternating current source, it should be appreciated that it may also be a load.

BRIEF DESCRIPTION OF THE DRAWINGS

FIG. 4A is a voltage waveform for a 240 VAC (RMS) AC line, which may be connected with a bi-directional inverter-charger to charge a battery or otherwise provide charge current to a DC source conforming to aspects of the present disclosure;

FIGS. 4B-4E are voltage waveforms of control signals that may be used to control operation of switches employed in an H-bridge portion of a bi-directional inverter-charger conforming to aspects of the present disclosure;

FIG. 6A is a voltage waveform for the output of a boost circuit portion of a DC-to-DC portion of a bi-directional inverter-charger conforming to aspects of the present disclosure;

FIG. 6B is a current waveform for an inductor of a boost circuit portion of a DC-to-DC portion of a bi-directional inverter-charger conforming to aspects of the present disclosure;

FIG. 6C is a voltage waveform for an inductor of a boost circuit portion of a DC-to-DC portion of a bi-directional inverter-charger conforming to aspects of the present disclosure;

FIG. 6D is a voltage waveform across a switch of a boost circuit portion of a DC-to-DC portion of a bi-directional inverter-charger conforming to aspects of the present disclosure;

FIG. 6E is a PWM control signal for a switch of a boost circuit portion of a DC-to-DC portion of a bi-directional inverter-charger conforming to aspects of the present disclosure;

FIG. 10A is a output voltage waveform for a buck circuit connected with an H-bridge in a grid tie (discharge/inverter) configuration of one example of a bi-direction inverter-charger;

FIG. 10B is a output current waveform for a buck circuit connected with an H-bridge in a grid tie (discharge/inverter) configuration of one example of a bi-direction inverter-charger;

FIG. 10C is a voltage waveform for a 240 VAC (RMS) AC line, which may be connected to in a grid tie arrangement with a bi-directional inverter-charger conforming to aspects of the present disclosure.

DETAILED DESCRIPTION

Aspects of the invention involve an inverter-charger system that uses common components for both inverter and charger functions. In one application, the inverter-charger is employed in a plug-in hybrid electric vehicle or electric vehicle application, internal or external to the vehicle, and provides for charging a vehicle battery or other rechargeable energy storage device and also allows the battery to be connected to an electric power grid or otherwise and deliver power to the grid. In charger mode, the inverter-charger is coupled with an alternating current (AC) power source, such as a conventional 120V or 240V wall outlet, and the AC power is converted to direct current (DC) for charging the battery coupled with the inverter-charger. In inverter mode, the same inverter-charger reverses the flow of energy and converts DC power from the battery to AC power and provides the AC power to the grid. Hence, by employing an inverter-charger system as discussed herein, the vehicle battery may act as energy source for use in powering the vehicle and may also act as an energy source to deliver energy to the grid, a home, or otherwise for other uses.

Figure 1:
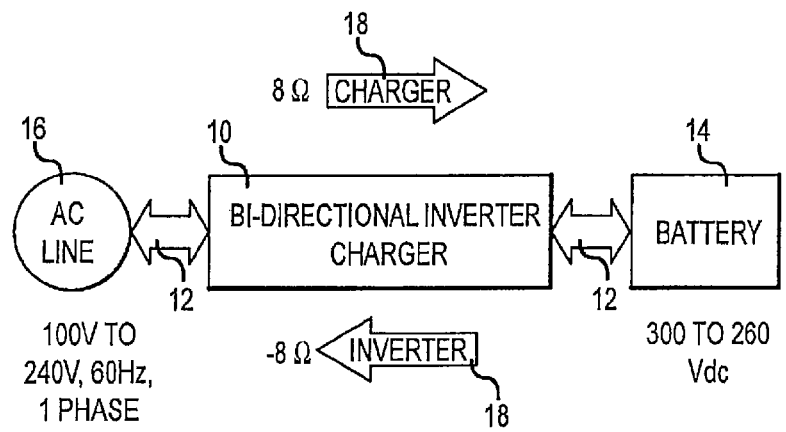
FIG. 1 is a block diagram illustrating a bi-directional inverter-charger coupled between an AC line and a battery pack.

FIG. 1 is a high level block diagram of one example of inverter-charger system 10 as might be used to control the flow of electrical energy 12 in a vehicle-to-grid, vehicle-to-home, or other application. The inverter-charger is functionally positioned between a battery pack 14 of a vehicle and an alternating current supply 16. The battery pack may have a direct current voltage of between 150 and 380 volts; however, the inverter-charger may be used with packs having other voltages, whether higher or lower than the examples used herein. The various battery pack voltage examples used herein are often nominal or peak, and may be lower when in a discharged state or higher during charging. The alternating current supply in the system example of FIG. 1 is an alternating current line voltage of between 100 volts and 240 volts at 60 Hz (single phase), with typical residential U.S. line voltages being 120 VAC or 240 VAC. The inverter-charger may be configured to couple with other alternating current voltage levels. "Charging" is the term that describes when the system is configured to convert the alternating current from the line to direct current to charge the battery pack 14. "Inverting" is the term that describes when the system is configured to convert the direct current voltage from the battery pack to alternating current in order to couple the battery pack to the grid or other source. The inverter charger can also be configured to provide AC energy to power loads or used as an emergency or auxiliary power source.

The inverter-charger system is discussed herein within the context of a plug-in hybrid or electric vehicle having a battery pack and a conventional alternating current line voltage. The inverter-charger, however, may be deployed in other systems where bi-directional coupling between a high voltage AC and high voltage DC energy storage/supplies are required. For example, the AC supply may be provided from a wind turbine array. In such an example, it is quite possible that the battery may be used for energy storage when energy from the turbine is not available (not windy). For example, in a facility, whether a home or otherwise, with a wind turbine providing power to the facilities energy grid, the plug-in hybrid battery may be tied to the grid and be charged. When the turbine is not delivering energy, the battery may be used to provide grid energy for the home's power needs. Further, numerous such possible uses will evolve as smart grid and other such technologies are developed and deployed.

Figure 2:
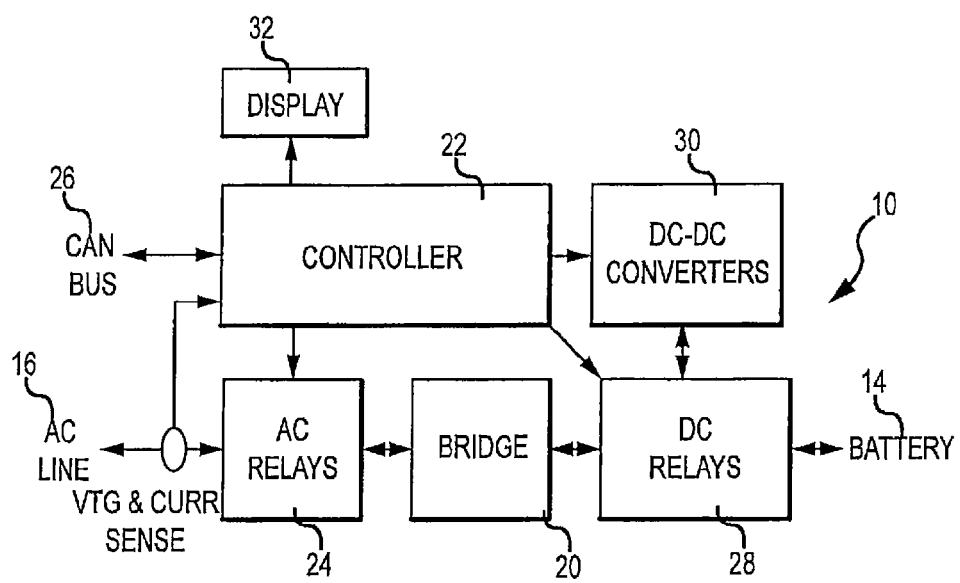
FIG. 2 is a block diagram illustrating one possible implementation of a bi-directional inverter-charger.

FIG. 2 is a block diagram of one example of an inverter-charger system 10. As introduced in FIG. 1, the inverter-charger is functionally positioned between the battery pack or other storage system 14 and a line voltage or other supply voltage 16. In the energy path 12 between the battery and line, there is a rectifier/inverter (or bridge) 20 and DC-DC conversion components 30. Configured as a charger, the rectifier converts the AC line voltage to a full-wave rectified DC voltage. From the rectified DC voltage, the DC-DC converters 30 then provide the proper charge current at the proper DC voltage to the battery pack 14. Configured as an inverter, the DC-DC converters up convert the DC battery pack voltage to an appropriate voltage level for the inverter 20 to convert the DC voltage to an AC line voltage, sufficient to deliver power, and at the proper frequency.

The system 10 may be advantageously configured to use the same inverter/rectifier 20 and DC-DC converters 30 in both the charging and inverting modes, which is accomplished through DC relays 28, solid state switches, or other switch mechanisms. The DC relays, under programmatic control of a controller 22, are configured to alter the energy flow path between the battery 14, appropriate DC converter components 30, and the bridge 20. While AC relays 24, also under programmatic control of the controller 22, are shown connecting the bridge 20 to the line 16 during both charging and inverting, the implementations discussed herein do not include AC relays.

Figures 3, 3A:
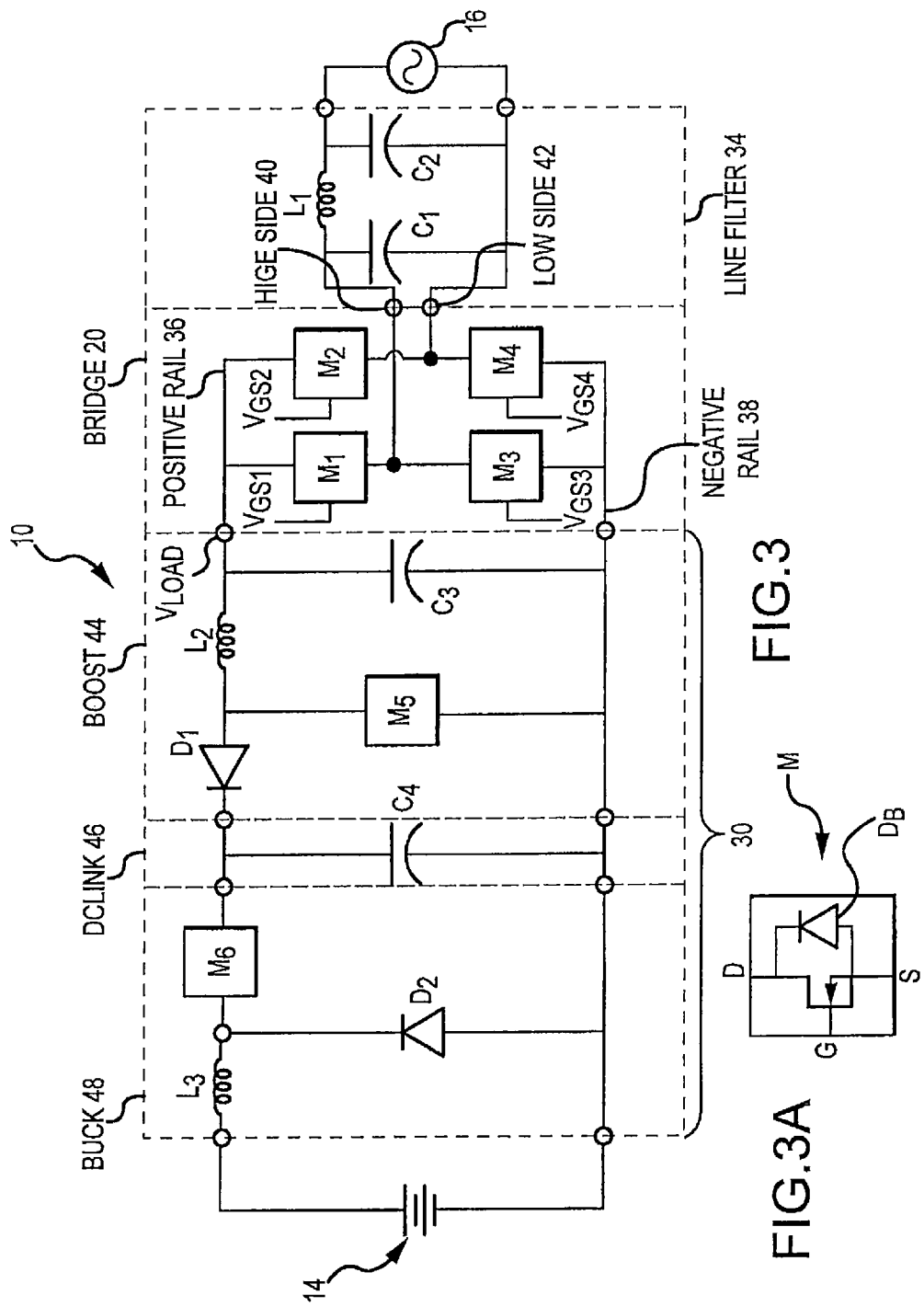
FIG. 3 is an electrical schematic of one possible implementation of a bi-directional inverter-charger configured for charging a battery pack.
FIG. 3A is a diagram of one possible power MOSFET that may be used to implement various switches discussed herein.

FIG. 3 is a circuit diagram of one example of an inverter-charger 10 configured for charging. Discussing the circuit from right to left, i.e. from the AC source 16 to the battery 14, the inverter-charger 10 includes a line filter 34 connected to the source 16. The line filter is a conventional line filter comprising two capacitors (C1 and C2) in parallel with the source 16, and an inductor L1 in series with the source and connected between each capacitor. The line filter attenuates or otherwise reduces electromagnetic interference between the line 16 and the inverter-charger. The line filter shown is but one example of filter configurations that might be employed in various implementations conforming to the present disclosure.

A rectifier 20 is coupled with the line filter. The rectifier includes four transistor switch configurations MI-M4 arranged as an H-bridge. The H-bridge configuration allows for bidirectional energy flow through the circuit. Hence, with the H-bridge under programmatic control, the circuit may be operated as a full wave rectifier in charge mode and as an inverter in the inverter grid tie or auxiliary source discharge mode.

In one particular implementation, each switch M comprises three n-junction power MOSFETS connected in parallel. FIG. 3A is a transistor diagram for one power MOSFET. In one example, the power MOSFETS are STYGONM50 models from IXYS Corporation. It is also possible to use insulated-gate bipolar transistors, other switching devices, diodes, or the like, depending on the implementation. In the FIG. 3A power MOSFET example, a body diode (or anti-parallel diode) DB provides a freewheeling path when the switches are off. The MOSFETS have a drain (D), gate (G) and source (S), and a threshold voltage VGS between the gate and source determines whether the MOSFETS are on and conducting or off and not conducting. These gate circuits can be controlled programmatically by the controller 22.

Switch MI has its drain connected to a positive rail 36 and its source connected to a high side 40 of the line filter. The high side of the line filter and a corresponding low side 42, correspond with the AC voltage across the line voltage 16. Switch M2 has its drain connected to the positive rail 36 and its source connected to the low side 42 of the line filter. Switch M3 has its drain connected to the high side voltage 40 and its source connected a negative rail 38. Finally, switch M4 has its drain connected to the low side voltage 42 and its source connected to the negative rail 38. The gates of each switch MI-M4 receives a control signal (VGS1-VGS4, respectively) from the controller 22, which may be in the forms of pulse width modulation signals, to control when the switches are on or off.

Figure 4D:
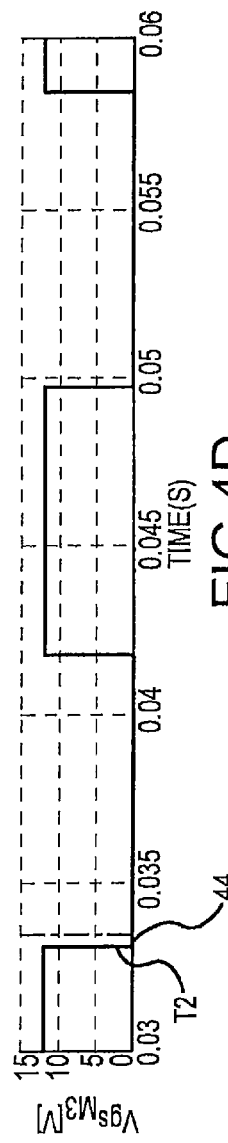
Figure 4E:
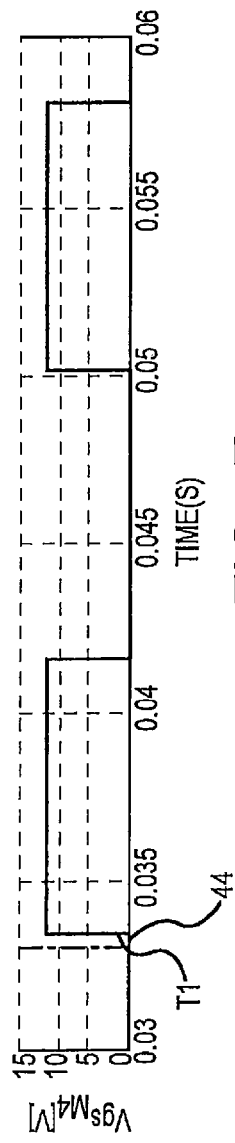

FIG. 4 illustrates five signal diagrams, one of the input voltage (FIG. 4A) to the bridge 20, and one for the control signals to each of the switches MI-M4 (FIG. 4B, PWM control VGS1 for MI; FIG. 4C, PWM control VGS2 for M2; FIG. 4c, PWM control VGS3 for M3; and, FIG. 4E, PWM control VGS4 for M4). The input voltage to the bridge, as shown in FIG. 4A, is a 60 Hz wave form of 240VAC (RMS), with peak voltages of approximately positive 340 volts and negative 340 volts. Generally speaking, the bridge switches are synchronized with the line frequency to provide a full wave rectified output. In one particular implementation, the threshold voltage for each power MOSFET MI-M4 is 2.4;hence, the PWM signal for each transistor switches between approximately 12 volts and 0 volts at a 50% duty cycle. In this example, the 12 volt "on" voltage provides a margin of error above the threshold voltage to help avoid erroneous switch activation. The duty cycle is aligned with a zero crossing point of the line voltage and about a dead band, so that at or above 12 volts magnitude each switch is on and conducting, and below 12 volts magnitude each switch is off. To operate as a full wave rectifier and as shown in FIGS. 4B-4E, the control signals for switches MI and M4 are the same, and the control signals for switches M2 and M3 are the same, with the control signals for each pair between approximately 180 degrees out of phase. Stated differently, switches MI and M4 are turned on, while switches M2 and M3 are off, and switches MI and M4 are then turned on while switches MI and M4 are turned off.

To avoid having switches MI and M3 or M2 and M4 on and conducting at the same time, the PWM control signals may provide a dead band between each control signal transition where all the control signal voltages are held at 0 volts and hence all of the switches are momentarily off and not conducting. For example, there is a dead band 44 where all of the control signals are at zero volts. Referring to FIGS. 4B-4E, the control signals VGS1 and VGS4 transition TI from 0 to 12 volts at the same time, while the control signals VGS2 and VGS3 transition T2 from 12 to 0 volts at the same time. With respect to each of the illustrated first control signal transitions TI and T2, VGS1 and VGS4 are at zero volts while control signals VGS3 and VGS4 transition to zero volts. For a period of time, the dead band 44, all control signals are zero volts. After the dead band, VGS1 and VGS4 transition (TI) to 12 volts while VGS3 and VGS4 remain at 0 volts. In one example, the dead band for a 110/120VAC source voltage is 300 microseconds and the dead band for a 220/240VAC source voltage is 140 microseconds.

The bridge dead bands may be achieved in various ways. In one example, a comparator with some threshold voltage input, e.g., 9.1 Volts, is compared to the line voltage. When the line voltage meets or falls below the threshold, whichever PWM signals are high (and hence the driven switches are conducting) are driven low to generate the dead band. Other ways of providing the dead band are also possible.

Figure 4F:
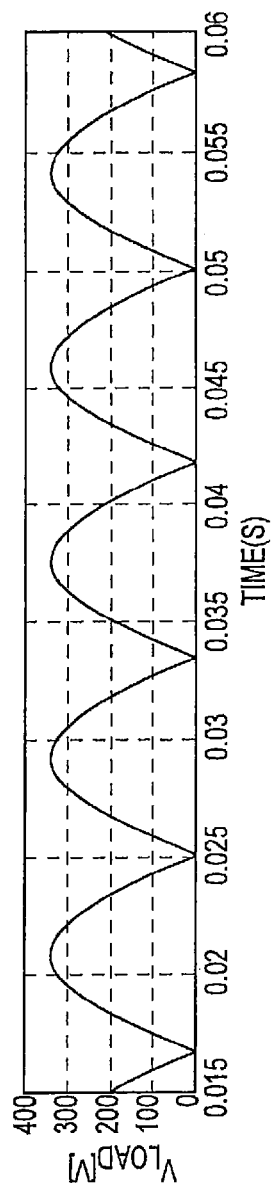
FIG. 4F is a voltage waveform for a rectified AC signal from an H-bridge portion of a bi-directional inverter-charger conforming to aspects of the present disclosure.

FIG. 4F illustrates one possible full wave rectified output between the positive and negative rails (36, 38) of the bridge 20. The peak voltage is about 340 Volts, with an average DC value of 216 volts. Hence, the input to the DC-to-DC converter stage 30 is a full wave rectified sine wave. In the case of a 100 VAC or 120 VAC line voltage, the peak voltages are about 170 Volts and 160 volts, respectively.

Referring again to the charge configuration of FIG. 3, the DC-to-DC converter 30, in one particular implementation, involves a boost circuit 44 followed by a buck circuit 48, with a DC link 46 positioned between the boost and buck circuits. The boost circuit amplifies or steps up the full wave rectified voltage. In one example intended to charge a battery pack with about a 372 VDC (fully charged voltage), the boost stage is configured to produce about 400 Volts DC. The boost stage may include a capacitor C3 coupled between the positive rail 36 and the negative rail 38, and in parallel with the output of the bridge 20. The boost circuit may further include an inductor L2 in series with a diode D1. A control switch M5, which may be of the same form shown in FIG. 3A, is in parallel with the capacitor C3, and has its drain connected between the inductor L2 and the diode D2. The source of the control switch is connected with the negative rail 38. The gate of the switch is configured to receive a control signal from the controller 22, which may include a proportional integral (PI) controller and a PWM module. Due to potentially high current loads, the switch M5 may be realized by three power MOSFETS connected in parallel.

Figure 5:
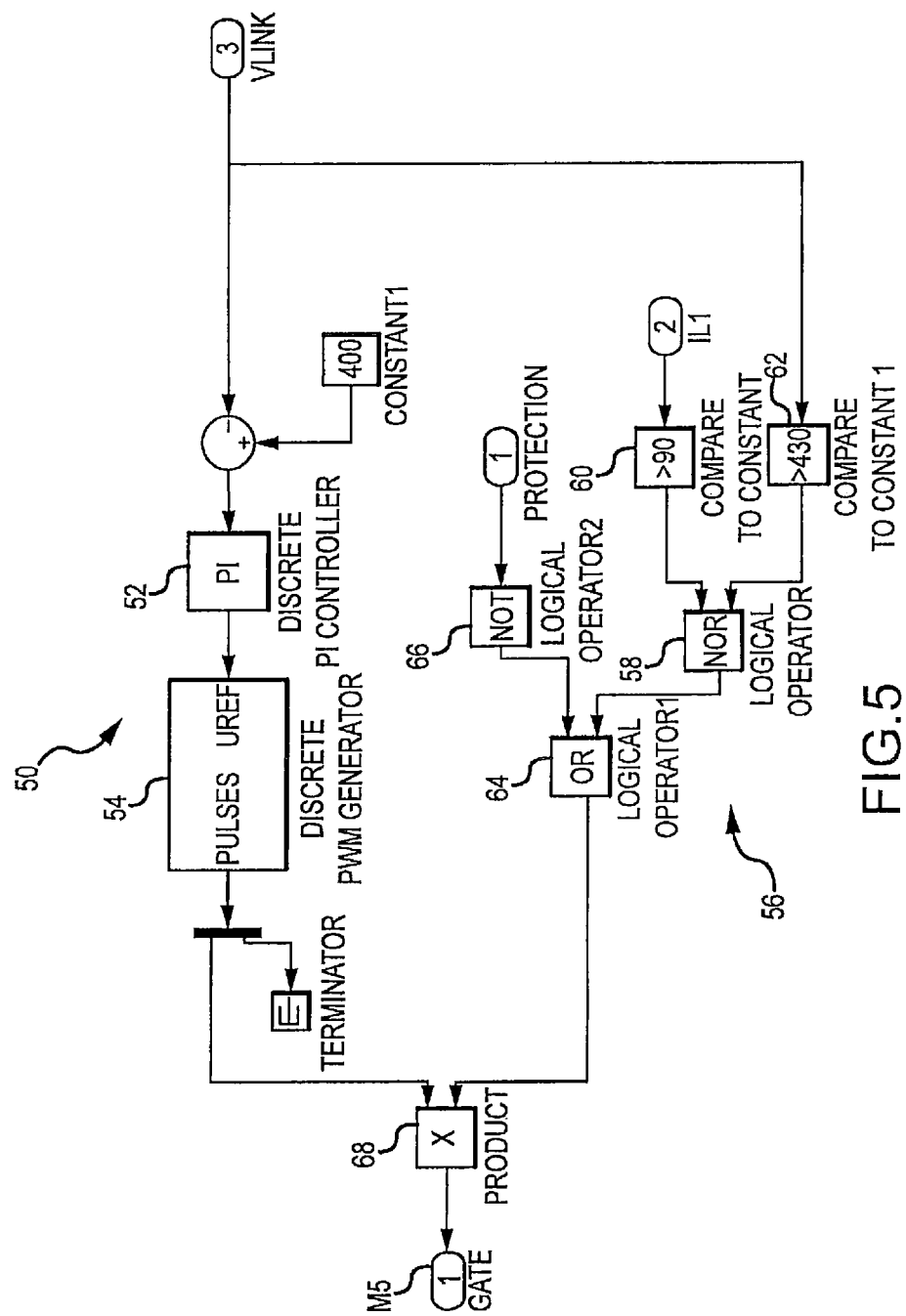
FIG. 5 is a control diagram for a boost circuit forming a portion of a DC-to-DC portion of a bi-directional inverter-charger conforming to aspects of the present disclosure.

FIG. 5 is a diagram illustrating a controller configuration 50 that provides a control signal to the boost switch M5. The controller 50 may form a portion of the overall control 22. The controller includes a PI controller 52 providing a reference voltage to a PWM generator 54. The PI controller receives as its input, a voltage signal representing the difference between the output of the boost circuit, which is one example should be 400 VDC, and reference voltage of 400 VDC. Hence, the PI controller receives an input voltage signal representing the difference between the actual output of the boost circuit 44 and the expected output of the boost circuit. In turn, the PI controller provides a reference signal to the PWM module 54 that drives a voltage signal to the switch M5 in order to maintain the boost circuit output at the specified voltage (e.g., 400 VDC).

In one particular boost circuit implementation, C3 has a value of 4.7 uF, L2 has a value of 50 uH, and C4 (the link capacitor) is 2.16 mF. The PWM signal may have a duty cycle range between 0 and 0.95, and the PI controller may be set at Kp=0.1 (the proportional gain multiplier of the error input signal to the PI).

FIG. 6 illustrates various signal diagrams related to the boost circuit. More particularly, FIG. 6A illustrates the voltage output of the boost circuit (the voltage output across the DC link capacitor 46). The boost circuit output, with the parameters set forth herein, has a 400 VDC output with about 1V of ripple. FIG. 6B illustrates the current output of the inductor L2 and FIG. 6C illustrates the voltage of the inductor L2. The boost inductor current shows that it is in continuous conduction mode with about 40% ripple current. It is also possible to implement the boost circuit as well as other circuits to operate in discontinuous conduction mode. FIGS. 6D illustrates the voltage level of the switch M5 (between drain and source) for the PWM control signal to the gate of the switch M5 as shown in FIG. 6E.

Hence, FIGS. 6A-6E collectively illustrate the function of the boost circuit. When the switch M5 is on, under control of the circuit shown in FIG. 5, current from the capacitor C3 and rectifier circuit 20 are allowed to flow through the inductor L5 thereby charging the inductor to the target voltage (e.g., 400 VDC). When switch M5 is closed, 400 VDC (shown in FIG. 6C) is available from the inductor L2 to charge capacitor C4 to 400 VDC (or to maintain the capacitor voltage at 400 VDC) as shown in FIG. 6A.

Besides the boost circuit controller 50, FIG. 5 also illustrates a limiter circuit 56 configured to shut off the switch M5 when the output current from the boost circuit meets or exceeds a current threshold value or the output voltage of the boost circuit meets or exceeds a voltage threshold value. In one example, the limiter generates a control signal to turn off the switch when the output current of the boost circuit exceeds 90 amps or the DC voltage of the boost circuit exceeds 430 VDC. Other limiter threshold values are possible depending on the ratings of various components (e.g., maximum electrolytic capacitor C4 voltage, MOSFET current switching limitations, inductor L2 characteristics), and any number of other possible factors (e.g., overall maximum inverter-charger power conversion) that might effect circuit performance.

In one particular implementation, the limiter 56 includes a NOR gate 58 receiving as its inputs the results of two comparator circuits (60, 62). The first comparator 60 compares the output current of the boost circuit 44 to a current threshold value (e.g., 90 A). The comparator provides a digital 0 output if the boost circuit is less than 90 A, and provides a digital 1 output if the boost circuit current is greater than 90 A. The output of the comparator is fed into the NOR gate 58. Similarly, the second comparator 62 compares the boost circuit output voltage to a voltage threshold value (e.g., 420 VDC). The comparator provides a digital 0 output if the boost circuit voltage is less than 420 VDC, and provides a digital 1 output if the boost circuit voltage is greater than 420 VDC. The output of the second comparator 62 is also fed into the NOR gate 58.

The NOR gate 58 provides a digital 1 when both inputs are digital 0, otherwise the NOR gate provides a digital 0 or low voltage output (one or both inputs are digital 1). Thus, the NOR gate provides a logic 1 signal to an OR gate 64 only when both inputs of the NOR gate are logic 0, otherwise the NOR gates provide a logic 0 signal to the OR gate 64. The OR gate 64 receives as a second input, a protection input in the form of a digital 0 (logic 1 passing through an inverter (not gate) 66. Hence, the limiter provides a digital level 1 from the OR gate 64 to a multiplier 68 only when the boost current and voltage are below the thresholds. The multiplier also receives the PWM control signal that drives operation of the switch M5 as the second input to the multiplier. Thus, when either the inductor current of the boost circuit exceeds 90 A or the output voltage of the boost circuit exceeds 420 VDC, the limiter circuit provides a logic 0 to the multiplier, which in turn drives the control signal to the switch M5 low turning it off. When both the boost inductor current and output voltage are below the threshold values, the limiter circuit provides a digital 1 to the multiplier 64, allowing the control signal from the PWM 54 to pass through to the switch. Without a limiter circuit, the PWM is connected to the switch M5.

The output of the Boost/DC-Link provides a regulated DC voltage to the buck stage 48. In the charge configuration shown in FIG. 3, the buck stage regulates battery charging by controlling the charge current to the battery 14. The buck stage includes a switch M6 connected in series with the output of the boost circuit 44. An inductor L3 is coupled between a positive terminal of the battery 14 and the drain of the switch M6. A diode D2 is connected between the inductor/switch junction and the negative rail 38 of the inverter-charger. In one implementation, the inductor L3 has a value of 50 uH and the switch M6 is implemented with three power MOSFETS coupled in parallel.

Generally speaking, when switch. M6 is on, the boost circuit and the DC-link capacitor source charging current to the inductor L3. Further, the diode D2 is reverse biased. When the switch M6 is off, diode D2 is forward biased and stored energy in the inductor provides a charge current to the battery 14.

Figure 7:
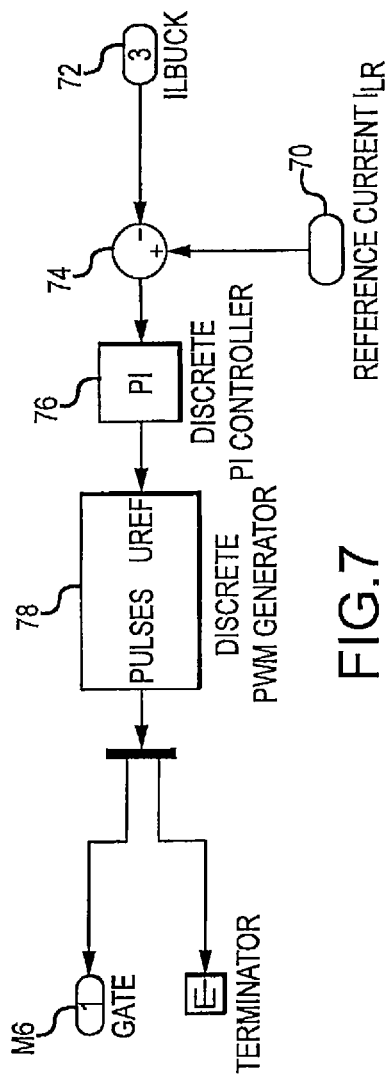
FIG. 7 is a charge current control diagram for a buck circuit forming a portion of a DC-to-DC portion of a bi-directional inverter-charger conforming to aspects of the present disclosure.

FIG. 7 is a diagram illustrating a controller configuration to control the operation of the buck circuit switch M6. While other implementations are possible, in the control diagram depicted in FIG. 7, buck circuit control involves a comparison between the buck circuit current output 72 to the battery 14 and a reference current 70. The reference current may be set at whatever the desired battery charging current. Further, the reference current level may be programmable. In one possible example, the reference current is 17 amps. A difference or error signal from a subtractor 74 (a difference between the actual current and the reference current) is provided as in input to a PI controller 76, which provides a reference voltage to a PWM generator 78. The PWM generator 78 provides PWM signal to the switch M5 thereby controlling the switch to thereby control the output charging current of the buck circuit.

Figure 8:
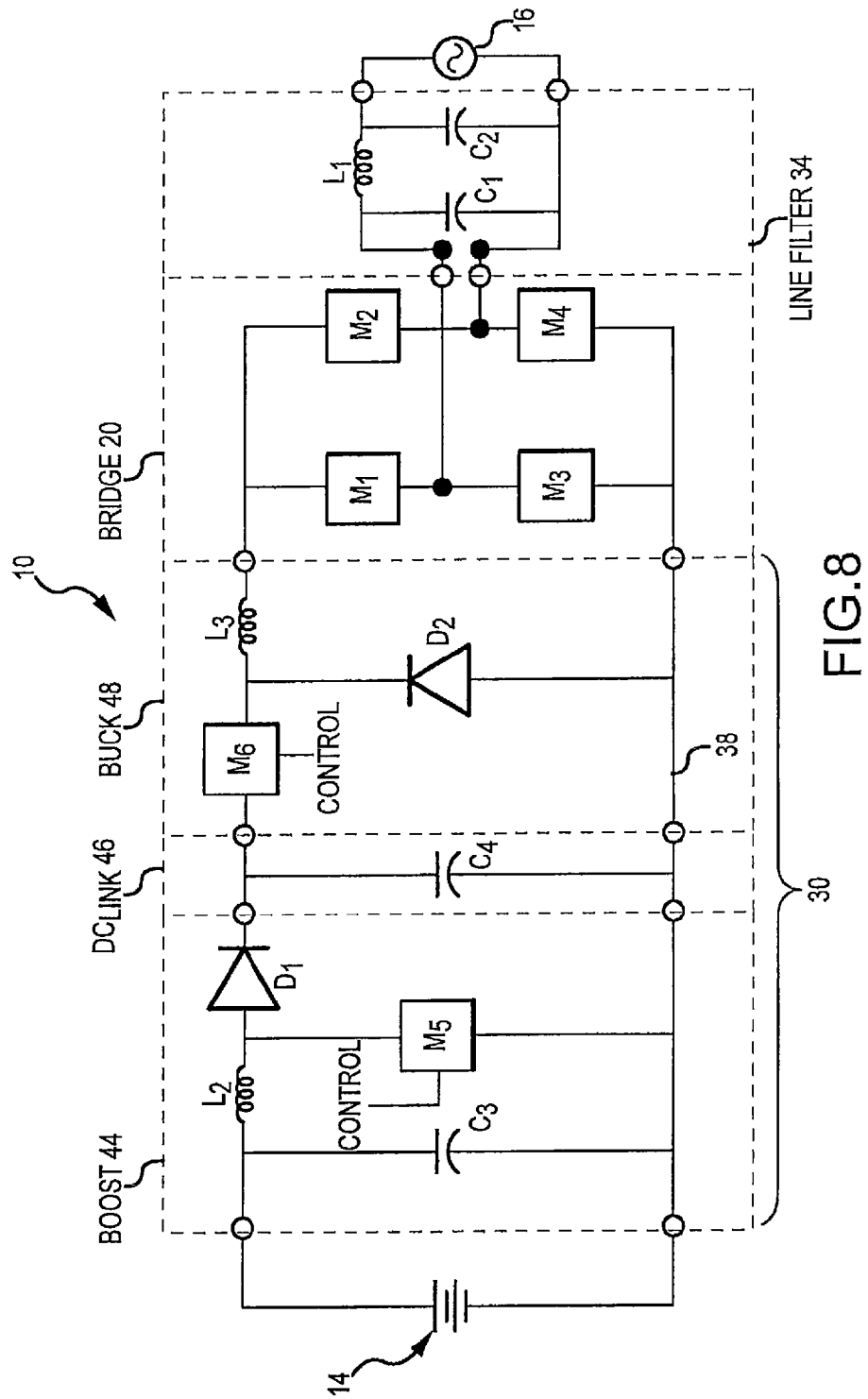
FIG. 8 is an electrical schematic of one possible implementation of a bi-directional inverter-charger configured for tying a battery pack to a grid or other load/source.

FIG. 8 is a circuit diagram illustrating the inverter-charger 10 in a discharge (inverter) configuration. In the discharge configuration, the battery 14 is coupled by way of the inverter-charger to the AC power supply (e.g., a power grid, or load, etc.) 16, and the battery delivers power to the source. Hence, in discharge mode, the battery may be used as a source for alternating current power. In a smart grid application, for example, the battery can act as a storage mechanism to deliver power back to the grid pursuant to any of a number of possible smart grid implementations (off peak charging, peak load discharge; grid regulation; back up power supply for home; storage for wind or solar power generation; etc.)

In the discharge configuration, the battery 14 is coupled with the DC-to DC converter mechanism 30. However, unlike the charge configuration where the buck circuit 40 (FIG. 3) is connected to the battery, the battery is switched to being coupled with the boost circuit 36. The boost circuit 36 provides a regulated DC voltage, higher than the pack voltage, in conjunction with the DC link 38, to the buck circuit 40. The buck circuit in turn provides proper current and voltage supply to the bridge 20 that, under PWM control, converts the output of the DC-to DC circuit 30 to an AC waveform suitable for coupling to the AC source 16 or for delivery directly to an AC load. For example, in the case of a conventional U.S. household outlet supply, the bridge provides a 60 Hz, 120 VAC (RMS) output voltage or 240 VAC (RMS) output voltage which, for grid tie applications, is precisely synchronized with the grid AC power.

Referring now in more detail to FIG. 8, the boost circuit 36 includes the same components (L2, D1, C3 and M5) in the same configuration as the boost circuit 36 of FIG. 3. However, by way of some form of switching mechanism, such as relays discussed in more detail with respect to FIG. 12, the boost circuit 36 is switched to being coupled with the battery pack 14. More particularly, the capacitor C3 is connected in parallel with the battery 14. The inductor L2, followed by the diode D1, are connected in series to the positive side of the battery 14. The switch M5 is connected in parallel with the capacitor C3, with its drain connected between the inductor and the diode, and its source connected with the negative rail 38.

For inversion, the boost stage 36 up converts the battery voltage to a direct current voltage sufficient to drive the rectifier with sufficient voltage for coupling to the source. For example, in the case of a system optimized for a 240 VAC source, the boost circuit 46 increases the battery voltage, which may be about 370 VDC to 400 VDC. The boost circuit may be controlled in generally the same manner in discharge mode as in charge mode through using the circuit shown in FIG. 5, with the PWM providing a control signal to the switch M5. Generally speaking, the controller is configured to monitor the DC link voltage (i.e. the voltage level of the boost circuit output) and through a feedback loop with a reference voltage (400 VDC in this example), maintain the boost output voltage at 400 VDC.

The boost circuit provides a regulated up converted voltage to the buck circuit 40. The buck circuit, in turn, provides an output signal appearing as a rectified sine wave input to the bridge 20. The buck circuit 40 includes the same components M6, L3, and D2 discussed with reference to the buck circuit 40 in the inverter-charger charge mode configuration of FIG. 3. The switch M6 is operated to alternately allow charging of the inductor, when the switch M6 is on, and allow discharge of the inductor energy to the bridge when the switch is off.

Figure 9:
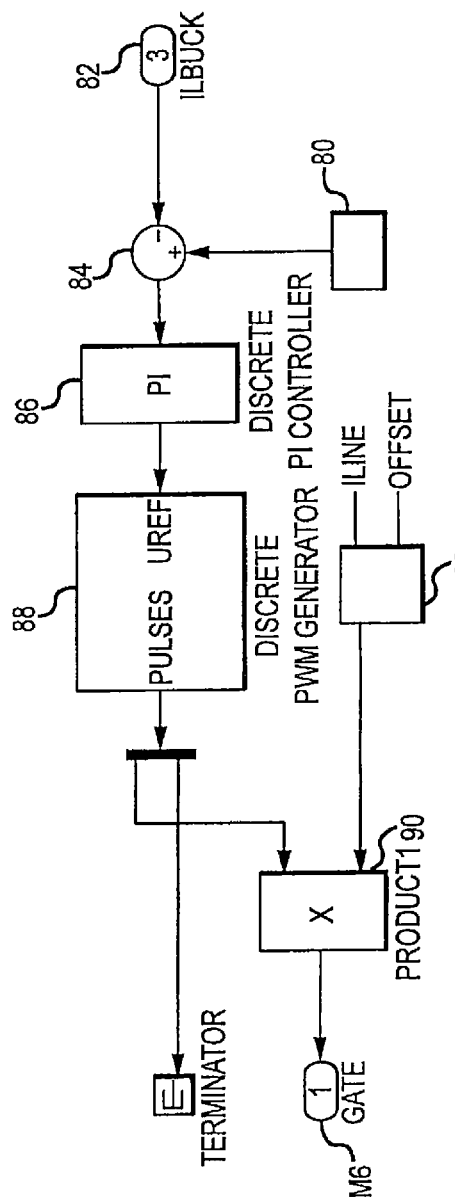
FIG. 9 is a grid tie control diagram for a buck circuit forming a portion of a DC-to-DC portion of a bi-directional inverter-charger conforming to aspects of the present disclosure.

FIG. 9 is a diagram of a controller for the buck circuit operating in inverter mode. The controller provides an output current (see FIG. 1 OC) to the bridge 20, with the output current having a dead band 94. First, to provide output current control of the buck circuit, the controller compares actual output current 82 of the buck circuit (at inductor L3) with a full wave rectified line current reference 80. A subtractor 84 provides the difference between the actual current and the reference current to a PI controller 86, which provides a reference signal to PWM 88.

Dead band control is provided by a comparator 92 that compares the rectified line voltage (or the line voltage) to a threshold or offset value above the zero crossing point of the line voltage. When the line voltage falls between the offset value and the zero crossing, the comparator provides a digital 0 output; otherwise the comparator provides a digital 1 output. A multiplier 90 receives the output of the comparator 92 and the PWM control signal. The PWM signal is thus provided to the switch M6 except during the dead band 94 provided through the dead band controller 92.

FIG. 10A illustrates the voltage output signal waveform of the buck circuit 40 in inverter mode, with a 400 VDC input voltage to the buck circuit for supplying the appropriate voltage waveform to a 240 VAC line. FIG. 10B illustrates the buck circuit current output, with dead band 94, that drives the bridge 20. As can be seen, the output wave forms are in the form of a full wave rectified waveform. The bridge circuit is controlled in the same way in discharge (inverter) mode as in charge mode, which is discussed herein with respect to FIG. 4. The output of the rectifier is shown in FIG. 1 OC, and is in the form of a 60 Hz 240 VAC (RMS) waveform.

Figure 11:
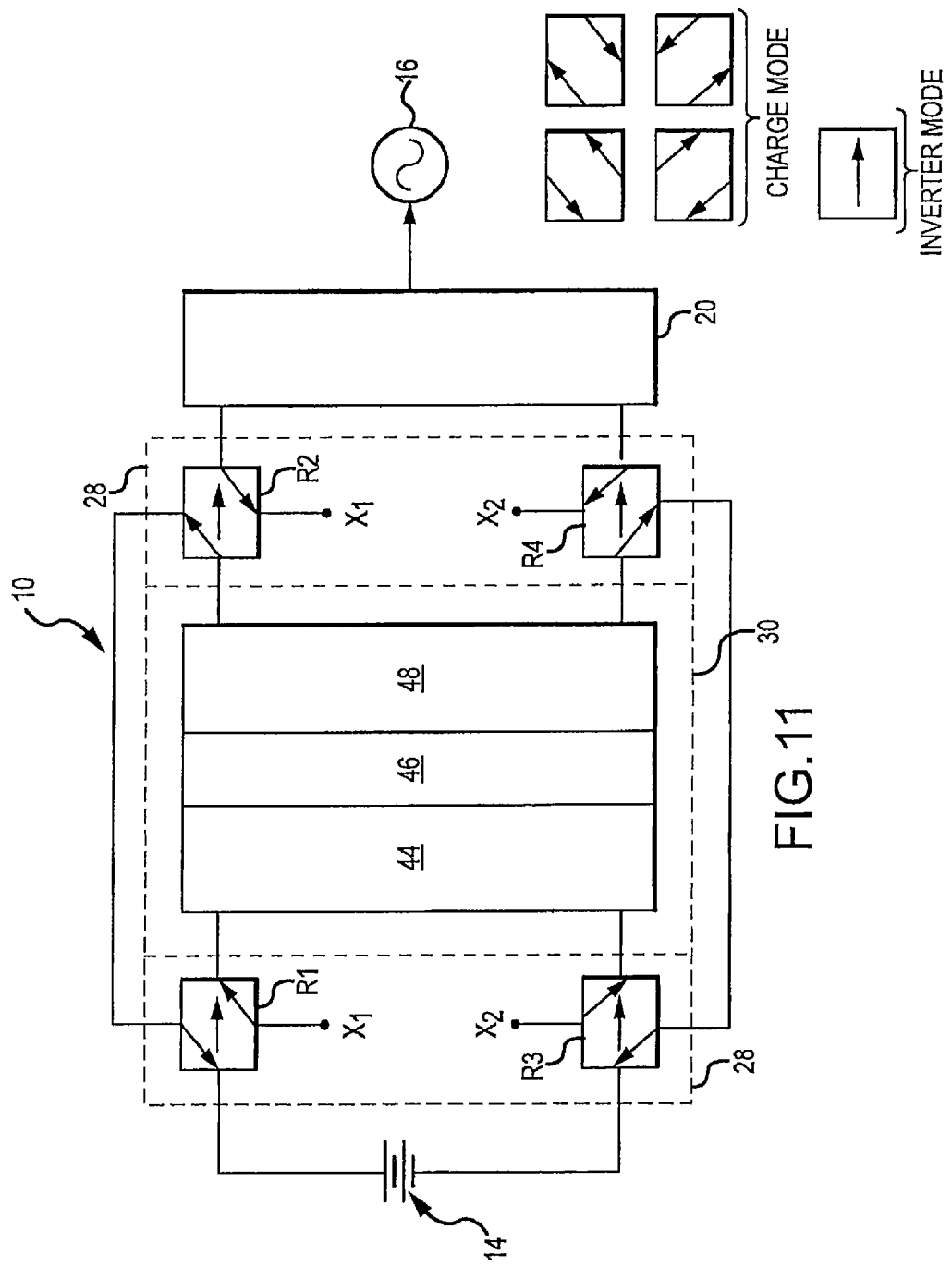
FIG. 11 is a schematic diagram of one possible arrangements of relays to provide for switching between charge and inverter modes of a bi-directional inverter-charger.

FIG. 11 is a diagram illustrating one possible relay configuration for switching between the charge mode configuration shown in FIG. 3 and the inverter mode configuration shown in FIG. 8. A set of relays 28 are provided to alter the connection of the DC-to-DC conversion components 30 between the battery 14 and the bridge 20. The diagram illustrates the functional connections achieved through any various possible implementation of relays. Relays or other forms of switches R1-R4 are positioned to switch between the charge configuration and the inverter configuration upon receipt of a mode signal. In charge mode, the bridge 20 is connected to the boost circuit through relays R1 and R4, and the battery is connected to the buck circuit 48 through relays R1 and R3. In inverter mode, the battery is connected to the boost circuit 44 through relays R1 and R3 and the buck circuit is connected to the bridge 20 through relays R2 and R4.

Although the present invention has been described with respect to particular apparatuses, configurations, components, systems and methods of operation, it will be appreciated by those of ordinary skill in the art upon reading this disclosure that certain changes or modifications to the embodiments and/or their operations, as described herein, may be made without departing from the spirit or scope of the invention. Accordingly, the proper scope of the invention is defined by the appended claims. The various embodiments, operations, components and configurations disclosed herein are generally exemplary rather than limiting in scope.

The invention claimed is:

1. An inverter charger for providing a bi-directional energy flow between an alternating current source and a direct current chargeable voltage source, the inverter charger comprising:
an H-bridge rectifier inverter circuit coupled with an alternating current voltage source;
a direct current voltage to direct current voltage converter (DC-to-DC converter) comprising a boost circuit and a buck circuit, coupled between the H-bridge rectifier inverter circuit and a direct current chargeable voltage source having a direct current voltage, the DC-to-DC converter switchable between a charge configuration and an inverter configuration;
the charge configuration including the boost circuit operably coupled with the H-bridge rectifier inverter circuit, the H-bridge rectifier inverter circuit providing a full wave rectified output signal to the boost circuit, the boost circuit configured to up convert the full wave rectified output signal, the charge configuration further including the buck circuit operably coupled with the boost circuit, the buck circuit configured to provide a regulated charge current to the direct current chargeable voltage source;

the inverter configuration including the boost circuit operably coupled with the direct current chargeable voltage source, the boost circuit configured to up convert the direct current voltage of the direct current chargeable voltage source, and the buck circuit configured to provide a full wave rectified signal wave form to the H-bridge rectifier inverter circuit, the H-bridge rectifier inverter circuit configured to tie an alternating current voltage waveform to the alternating current voltage source; and a plurality of switches configured to switch the DC-to-DC converter between the charge configuration and the inverter configuration by:

connecting an input of the boost circuit to the H-bridge rectifier circuit and an output of the buck circuit to the direct current chargeable voltage source in the charge configuration; and connecting the input of the boost circuit to the direct current chargeable voltage source and the output of the buck circuit to the H-bridge rectifier circuit in the inverter configuration.

2. The inverter charger of claim 1 wherein the plurality of switches comprise a plurality of relays.

3. The inverter charger of claim 1 wherein the H-bridge rectifier inverter circuit comprises four sets of three parallel connected power MOSFETS connected in a full wave H-bridge configuration, with each MOSFET operating synchronously with the alternating current voltage source wave form to produce a full wave rectified output of the alternating current voltage source.

4. The inverter charger of claim 1 further comprising control signals to the MOSFETS, wherein the control signals provide a dead band where all MOSFETS are off for a period of time around a zero crossing point of the alternating current voltage source.

5. The inverter charger of claim 1 wherein:
the inverter charger further comprises a negative rail;
the boost circuit comprises a first inductor and a first diode coupled in series, and a first capacitor connected with the first inductor, the boost circuit further comprising a first switch connected between the first inductor and first diode, and the negative rail, the first switch in parallel with the first capacitor, the first switch receiving a first control signal to up convert the full wave rectified output signal when the inverter charger is in the charge configuration or to up convert the direct current voltage of the direct current chargeable voltage source when the inverter charger is in the inverter configuration.

6. The inverter charger of claim 5 further comprising:
a DC Link capacitor in parallel with the boost circuit; and
a boost circuit controller comprising a limiter circuit including a first comparator that generates a first output value as function of whether a boost circuit current output exceeds a maximum boost circuit current threshold and a second comparator that generates a second output value as a function of whether the up converted full wave rectified signal at the DC link capacitor exceeds a maximum boost circuit voltage threshold, wherein the limiter circuit causes the control signal to turn off the boost circuit switch when the first output value and/or the second output values indicates that the maximum boost circuit current and/or maximum boost circuit voltage is met.

7. The inverter charge of claim 1 wherein:
the inverter charger further comprises a negative rail;
the buck circuit comprises a second switch in series with a second inductor, and a second diode connected between the second switch and the second inductor and the negative rail; the second switch receiving a second control signal for generating a specified charge current output of the buck circuit in the charge configuration; and
the second switch receiving a third control signal for generating a rectified sine wave input current to the bridge in the inverter configuration.

8. The inverter charger of claim 7 wherein the third control signal includes a dead band.

* * * * *